Figure 1:
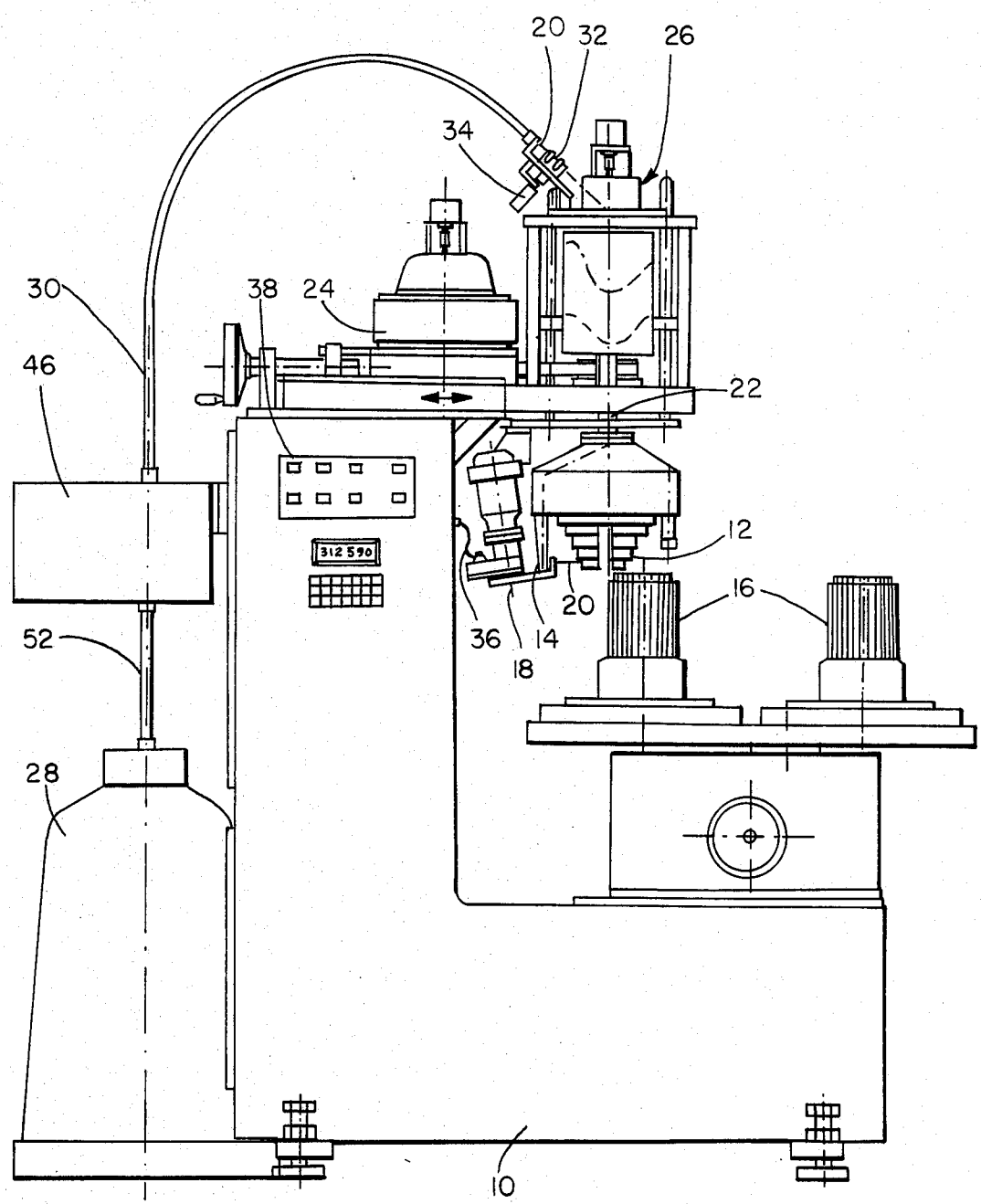

United States Patent [19]

Droll et al.

[11] Patent Number: 4,650,131

[45] Date of Patent: Mar. 17, 1987

[54] METHOD AND APPARATUS FOR WINDING WIRE COILS

[75] Inventors: Hans Droll; Willi Muskulus, Frankfurt, both of Fed. Rep. of Germany

[73] Assignee: Statomat-Globe Maschinenfabrik GmbH, Fed. Rep. of Germany

[21] Appl. No.: 732,630

[22] Filed: May 10, 1985

[30] Foreign Application Priority Data

May 11, 1984 [DE] Fed. Rep. of Germany ..... 34174699

[51] Int. Cl.⁴ .................. B21F 3/04; B65H 81/00; H02K 15/08
[52] U.S. Cl. .................. 242/7.03; 140/92.1; 242/7.09
[58] Field of Search ........... 242/7.12, 54, 58.5, 242/58.1, 128, 129, 7.14; 140/92.1

[56] References Cited

U.S. PATENT DOCUMENTS

| | | | |
|---|---|---|---|
| 2,319,828 | 5/1943 | Rohweder | 242/128 |
| 2,784,921 | 3/1957 | Washabaugh | 242/128 |
| 3,927,842 | 12/1975 | Dröll | 242/7.12 |
| 4,221,243 | 9/1980 | Muskulus | 140/92.1 |
| 4,388,952 | 6/1983 | Hamane et al. | 140/92.1 |

FOREIGN PATENT DOCUMENTS 1051770 8/1959 Fed. Rep. of Germany .
2717957 1/1983 Fed. Rep. of Germany .

*Primary Examiner*—Billy S. Taylor
*Attorney, Agent, or Firm*—Larson and Taylor

[57] ABSTRACT

A method and a device for winding wire spools for electric machines allow rapid change of the delivery spools (28, 28a). The wire lead of a new delivery spool is affixed in a holder (48, 48a) ready for the connection. The remainder of wire length of the preceding delivery spool is measured and winding nozzle (14) of the winding device is stopped at the time point when the wire length required for completion of a spool is found between the winding nozzle and the attachment point (48, 56). Then wire (20) is cut off at the attachment point, and the wire end to the rear is connected by means of a wire connection unit (56) with the ready wire lead of the next delivery spool.

10 Claims, 2 Drawing Figures

METHOD AND APPARATUS FOR WINDING WIRE COILS

The invention relates to a method and a device for the winding of solenoids, especially magnetizing coils for electric machines, by means of a rotary powered winding nozzle, to which winding wire is fed from a delivery spool, wherein the end of the wire is connected with the lead wire from the next delivery spool.

Methods of this sort are disclosed in DE-OS No. 28 08 048 and DE-PS No. 1 051 770. In these, the final length of wire from a delivery spool for all practical purposes doesn't appear at the winding nozzle, because an uninterrupted wire is fed through the nozzle. A drawback, however, is that the especially damage-susceptible junction points get in between the wire lengths or slings in the magnetizing coils of the series of delivery spools.

The traditional methods attempt to overcome this drawback by cutting off and removing the remaining wire end of the delivery spool following the winding of the last magnetizing coil or set of magnetizing coils which are to be wound with the wire from a certain delivery spool, and then the wire lead of the next delivery spool is introduced into the wire channel between its attachment point and the winding nozzle. This work step requires about five minutes in large installations. If a plurality of winding devices are interlinked in series, so that they cooperate e.g. with a common insertion device which draws the wound spools simultaneously into a stator, the winder shutdown times each time the entire interlocked unit stops, when there are three winders, can add up to approximately 40 minutes per 8-hour shift, i.e. to to about 8% of the work time.

To accelerate the introduction of the wire from a new delivery spool through the wire guide channel into the winding nozzle, it is already known to thrust the wire forward from the attachment point through the wire guide channel to the winding nozzle using compressed air or transport rollers (U.S. Pat. Nos. 3,967,658 and and 4,388,952). Difficulties can also arise in these processes, however, because of the length and curves of the wire guide channel as well as the wire stiffness. Also, then, on account of the difficult threading of the wire, the wire braking or dragging required to avoid jerking and tugging during the winding, and to equalize (or smooth) the wire traction, is taken up at the attachment point, i.e. before the wire guide channel. The other disadvantage thus relates to the fact that the winding wire remains under strong traction along the entire length of the wire guide channel. This multiplies the friction in the wire guide channel, whereupon the traction force required is further increased. However, the wire is stretched in an undesirable manner by the strong traction.

The object of the invention is hence to disclose a method of the cited type and a suitable device for its implementation, which provide that no junction points between wires of the various wire delivery spools get into the wound spools, and in addition also to provide a considerably more rapid and reliable wire change than is provided by the practical methods known until this time.

The present object is attained in that the wire end from a delivery spool is shortened a certain amount before connection with the next delivery spool, so that the connection point lies after the winding between two wound spools.

The device for implementation of the method according to the invention consists of a winding nozzle which can rotate around a winding template, a wire channel of certain length guided from an attachment point of a wire delivery spool to the winding nozzle, and a measuring and control device for disconnection of the rotary drive of the winding nozzle at the end of a delivery spool, and is characterized in that the winding nozzle can then be stopped by the measuring and control device, if the length of the wire channel is the same as the wire length required for completion of one magnetizing coil or a set of magnetizing coils. The measuring and control device therefore can be configured as disclosed in DE-PS No. 22 53 053.

Figure 2:
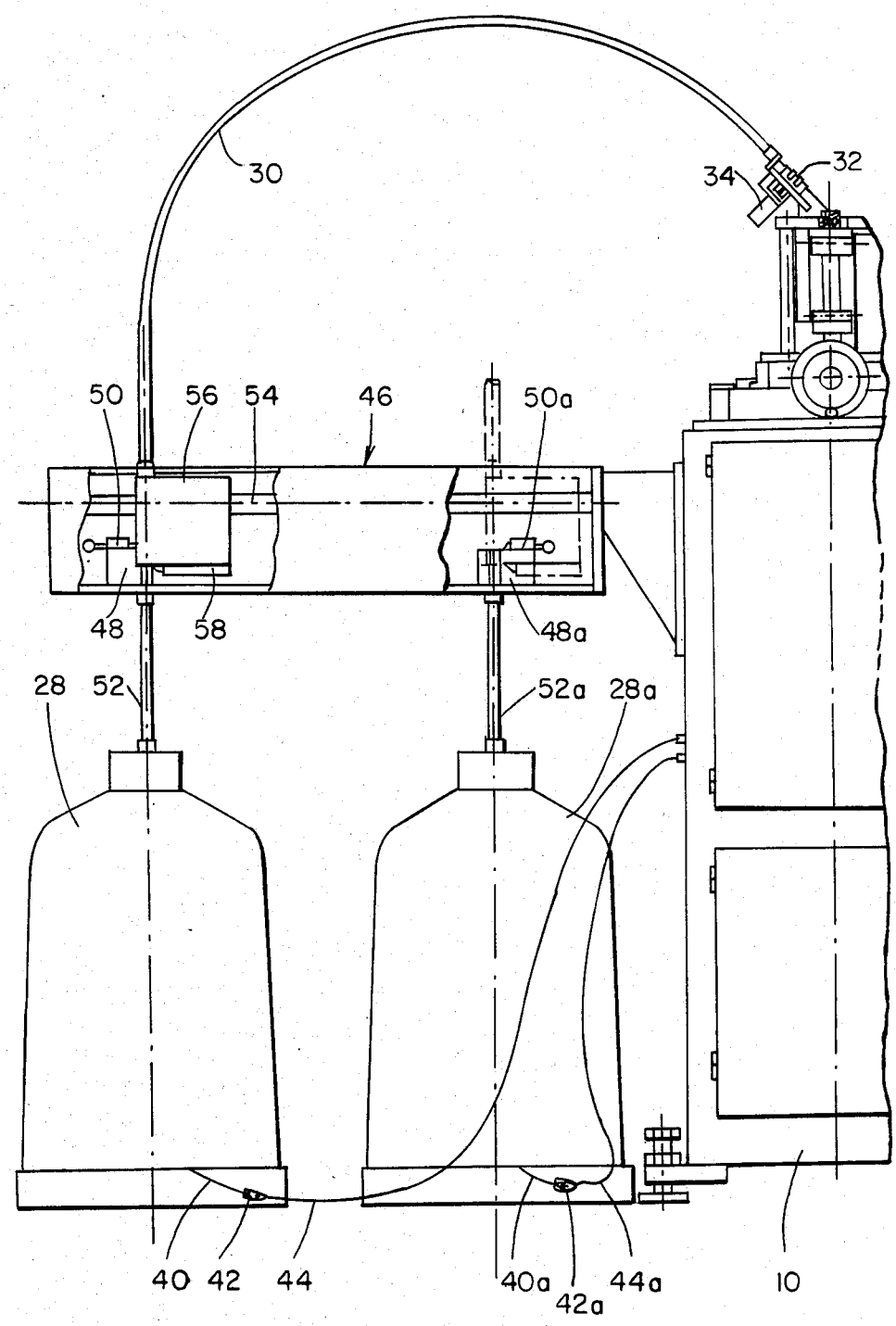

The invention will be further explained hereinafter relative to the attached drawings, wherein:

FIG. 1 is a side view of a winding device to produce spools for stators of electric machines, and FIG. 2 is a view from the left of the winding device shown in FIG. 1.

Winding devices of the type shown are generally known in their construction and winding operation, so that only the essential parts of the device need be discussed hereinafter. This consists of a housing 10 which carries the winding tools. In this example, these are a multi-stage winding template 12, a winding nozzle 14 (also called a flyer) and several collectors 16, which one after the other are conducted under winding template 12, in order to pick up the sets of magnetizing coils produced there and to transport them to a removal station (not shown). A clamping and cut-off device 18 is mounted next to the winding template on housing 10, which cuts off the winding wire 20 between winding nozzle 14 and winding template 12 after the winding of a set of magnetizing coils, and clamps the wire end leading to winding nozzle 14, until the first windings of the next set of magnetizing coils have been wound.

Winding nozzle 14 circling around template 12 during the winding process engages tightly on a central winding spindle 22, driven by a motor 24. 26 is the entire lifting mechanism for winding template 12 and includes the relevant wire cleaner (not shown).

Winding wire 20 is delivered on standard delivery spools, in shipment containers 28. The wire 20 is pulled off the upright delivery spools and comes out of the shipment containers through a top central opening. It is then fed through a wire channel 30, on which is arranged a wire drag mechanism 32, with a setting mechanism 34 for adaptation to different wire diameters and for production of the desired braking or drag force, and then is fed to the top end of the hollow winding spindle 22 and extends through this to winding nozzle 14.

An electric contact can be mounted in a known manner on clamping and cut-off device 18, which then comes into electrically conductive engagement with this wire at its front end each time the clamping and cut-off device clamps and cuts wire 20. The electric contact at the clamping and cut-off device 18 is in contact through an electric conductor 36 with measuring and control device 38. To this is also fastened the loose wire end 40 from the delivery spool in shipment container 28 through a clamp 42 and an electric conductor 44 (see FIG. 2). By measurement of the electric resistance of wire 20 between clamping and cut-off device 18 and clamp 42, measuring and control device 38 measures the remaining wire length on the delivery spool in container 28 in a known manner.

The other described features and parts of the device aid in acceleration of the transfer from one wire delivery spool to the next. For this purpose, another mounting is provided for a second container 28a next to the mounting for container 28, as in FIG. 2, with another wire delivery spool. Also, the end 40a from this last spool is fastened by a clamp 42a and electric conductor 44a to measuring and control device 38. Holders 48 and 48a are arranged directly over containers 28 and 28a in the example, both in a bracket 46, connected with housing 10, for the wire end guided out of the top of container 28 or 28a and also including a wire cutter 50 or 50a. Between container 28 or 28a and wire holder 48 or 48a, the wire can be guided in a tube or hose 52 or 52a. A wire connection unit 56 can be moved between the two holders 48 and 48a in bracket 46 along a rail 54. Because of the capacity of wire connection unit 56 to move, the wire channel 30, e.g. a hose, which is attached to this, must be flexible.

While one of the two delivery spools in container 28 or 28a is still attached to winding nozzle 14, the container is already prepared for the next following delivery spool and is ready for attachment. For that purpose, the wire end 40 or 40a is attached to clamp 42 or 42a and the wire lead is guided through tube 52 or 52a and fastened tightly in wire holder 48 or 48a. The wire lead is cut by wire cutter 50 or 50a, so that it occupies a precisely defined position in holder 48 or 48a. According to the type of wire connection which is used, the wire lead affixed in holder 48 or 48a can also already be ready for the connection process. Known wire connections are the percussion-weld connection, e.g. produced with apparatuses from the Firma Ideal, butt-weld connection, as described in DE-OS No. 27 17 957, impact pinch connection, and parallel pinch connection, with connection sheathings e.g. of the Firma AMP, and also the twisting connection. If a pinch connection is used, the connection sheathing already together with the wire lead of the next delivery spool is laid in position in holder 48 or 48a, ready for connection.

The transfer from one delivery spool to the next then occurs as follows:

After the measuring and control device 38 determines the cutting and clamping of wire 20 between two sets of magnetizing coils, so that the remaining wire length e.g. from the delivery spool in container 28 suffices only for the winding of one complete set of magnetizing coils, but no longer suffices for two sets of magnetizing coils, then the winding process runs entirely normally for the next set of magnetizing coils. Likewise, if not wound on a staged template with several compartments, but on one single template compartment, it would be wound on one single magnetizing coil. The winding stage however is already broken before completion of the set of magnetizing coils or the magnetizing coil, and indeed then winding nozzle 14 stops, if there is not sufficient wire length for completion of the directly wound set of magnetizing coils or magnetizing coil which is found between winding nozzle 14 and the attachment point between wire connection unit 56 and holder 48 in winding spindle 22 and wire channel 30. If one would then cut the wire with a wire cutter 58 mounted on wire connection unit 56 at this attachment point and wind further, then the set of magnetizing coils or the magnetizing coil would be completed directly, but the wire required for that would be drawn out of wire channel 30 and winding spindle 22.

On account of the practical difficulties involved with threading a wire lead through wire channel 30 and winding spindle 22, in the device which is shown, following the cutting off of the wire end from the delivery spool in container 28 which is no longer long enough for another set of magnetizing coils or magnetizing coil, by means of cutter 58, then wire connection unit 56 together with cutter 58 and the attached flexible wire channel 30 as shown in FIG. 2 are moved to the right, to holder 48a. There the wire lead of the new delivery spool in container 28a, optionally together with a pinch sheathing, are in predetermined position relative to another set of magnetizing coils or magnetizing coil. There the wire is cut by clamping and cut-off device 18. The cut thus is made at or quite near the junction point. Since the wire ends which are formed are brought up for electric connection with the spools, no further complications arise.

The invention has been described only as an example of a winding device for production of magnetizing coils for stators of electric machines. However, generally speaking, it is also suitable for the production of magnetizing coils in the general sense, including all such windings which produce or are moved in an electric field, especially rotor windings. Specialized wire windings could also be used.

Furthermore, it is to be understood that the described method according to the invention is independent of the winding device selected in the individual case, the type, number and construction of the winding tools, the method of measuring wire lengths and the number of delivery spools which are ready in a waiting position. Thus, scales could be mounted on the delivery spools for continuous measurement of the remaining wire length, and the remaining wire length could be determined from the measured wire weight.

As already assumed from the enumeration of reliable wire connections above, the invention is not determined for any special connection method. It is to be understood that wire connections which lead to a thicker junction point than the wire diameter require temporary opening of the wire drag mechanism 32 by means of its operation device 34, in order to allow the junction point to pass. Also, the device according to the invention is not limited to wire connection unit 56 working between wire holders 48 and 48a. It could also be provided that the wire connection unit is stationary and holder devices 48 and 48a connected with flexible hoses 52 and 52a are alternately connected to the wire connection unit.

We claim:

1. A method for winding wire, taken from spools, to form coils for electrical machines or the like, comprising:

delivering wire from a first spool to a winding nozzle and periodically cutting off the wire at a cutting off point in the vicinity of the winding nozzle, sensing the length of wire remaining on the first spool and up to the cutting off point, and, at a connecting point before the normal end of the wire on the first spool, connecting that wire to the leading end of wire from a second spool when the sensing steps senses that there is an insufficient length of wire on the first spool and up to the cutting off point to finish winding a complete coil.

2. The method of claim 1, including conducting said sensing step continuously, and stopping the winding nozzle when said insufficient length is sensed, cutting the wire from the first spool at said connecting point and connecting it to the leading end of the wire from the second spool.

3. The method according to claim 1, including the step of holding the leading end of the wire from the second spool in a ready position, ready to be connected to the cut end of the wire from the first spool, and then bringing the cut end of the wire from the first spool to the wire of the second spool and performing said connecting step.

4. The method of claim 1, including conducting said sensing step in intervals, and stopping the winding nozzle when said insufficient length is sensed, cutting the wire from the first spool at said connecting point and connecting it to the leading end of the wire from the second spool.

5. The method of claim 4, including the step of holding the leading end of the wire from the second spool in a ready position, ready to be connected to the cut end of the wire from the first spool, and then bringing the cut end of the wire from the first spool to the wire of the second spool and performing said connecting step.

6. The method of claim 1, including the step of moving the connection formed at the connecting point to the cutting off point and at that location cutting the wire in the vicinity of its connection between the wire from the first spool and the wire from the second spool.

7. An apparatus for winding wire, taken from spools, to form coils for electrical machines or the like, comprising:
    means for delivering wire from a first spool to a winding nozzle which is in turn adapted to wind the wire onto templates to form coils, and means for periodically cutting off the wire at a cutting off point in the vicinity of the winding nozzle,
    means for sensing the length of wire remaining on the first spool and up to the cutting off point and for determining if said length is insufficient to finish a complete coil,
    and means which, upon sensing an insufficient length, connects a connecting point on the wire from the first spool, located before the normal end of that wire, to a leading end of wire from the second spool.

8. An apparatus according to claim 7, including means defining an attachment point for connecting the wire from the first spool to the leading end of the wire from the second spool, and including a channel of a predetermined length, from the attachment point to the winding nozzle, the wire being delivered through said channel, whereby the channel forms a known length between the attachment point and the winding nozzle.

9. An apparatus according to claim 8, including a wire drag means located in said channel.

10. An apparatus according to claim 8, including an attachment point for each of said spools, and wherein the inlet end of said channel is moveable to either of said attachment points.

* * * * *